United States Patent [19]

Kawamura

[11] Patent Number: 5,454,356
[45] Date of Patent: Oct. 3, 1995

[54] ENGINE WITH PRE-CHAMBER

[75] Inventor: Hideo Kawamura, Samukawa, Japan

[73] Assignee: Isuzu Ceramics Research Institute Co., Ltd., Fujisawa, Japan

[21] Appl. No.: 120,348

[22] Filed: Sep. 14, 1993

[30] Foreign Application Priority Data

| Sep. 14, 1992 | [JP] | Japan | 4-271072 |
| Nov. 11, 1992 | [JP] | Japan | 4-326058 |
| Nov. 19, 1992 | [JP] | Japan | 4-332211 |

[51] Int. Cl.⁶ .................................................. F02B 19/02
[52] U.S. Cl. .......................................... 123/254; 123/292
[58] Field of Search ............................... 123/254, 255, 123/292

[56] References Cited

U.S. PATENT DOCUMENTS

| 4,300,497 | 11/1981 | Webber | 123/254 |
| 4,372,264 | 2/1983 | Trucco | 123/292 X |
| 5,054,443 | 10/1991 | Kawamura | 123/292 X |
| 5,067,458 | 11/1991 | Bailey | 123/292 |

Primary Examiner—Tony M. Argenbright
Attorney, Agent, or Firm—Staas & Halsey

[57] ABSTRACT

This combustion engine has a pre-chamber and main chamber connected by a connection passage opened and shut by a control valve, the control valve operates separately for two steps. The operation of this control valve uniformly mixes the air of the pre-chamber and the main chamber. Therefore, various fuels which contain the gas fuel are efficiently burnt.

20 Claims, 4 Drawing Sheets

ENGINE WITH PRE-CHAMBER

BACKGROUND OF THE INVENTION

1. Field of the Invention

This invention relates to a high compression ratio internal-combustion engine which locates the control valve in sub-chamber.

2. Description of the Prior Art

The higher compression ratio ($\epsilon$) usually leads to increased performance of the engine.

Therefore, the gasoline engine drives the compression ratio as about 8–10 to 1.

The engine cannot demonstrate enough performance when this compression ratio is further increased, generating the knock in the combustion cylinder of the engine.

In a diesel engine, the fuel is ejected to the air, compressed in the combustion cylinder and burns.

Therefore, the diesel engine increases the compression ratio to about 18–23 to 1 and improves the performance.

The gasoline engine mixes the fuel with air and makes a so-called pre-mixture beforehand outside the engine and injects this into the cylinder as we have described.

When the compression ratio of the gasoline engine is raised to more than 8–10 to 1 and the temperature of the compressed air in the combustion cylinder is raised, the pre-mixture gas injected into the combustion cylinder ignites and a knock is generated before spark is ignited.

It is difficult for the gasoline engine to increase the compression ratio to more than an old value.

On the other hand, the fuels used by engines are fossil fuels such as: gasoline, light oil and natural gas.

When these fossil fuels are used for the fuel of the engine, a lot of materials which pollute atmosphere such as nitrogen oxide and soots are included in exhaust gas. An engine which burns methanol can be developed with little pollution.

As mentioned above, the content of soot and nitrogen oxide in exhaust gas decreases when the methanol is used for the fuel of the engine.

When the load of the engine is high, a lot of problems are not caused. However, with a low engine load, the wall temperature of the combustion cylinder decreases. However, the latent heat of evaporation of the methanol is large and the ignition temperature is high.

Therefore, evaporation and the activation of the methanol become difficult and the combustion cylinder of the engine does not fire smoothly.

SUMMARY OF THE INVENTION

In view of the aforesaid drawbacks of conventional internal-combustion engines, it is an object of the invention to provide an engine with pre-chamber, wherein even if the compression ratio of the air of the engine is increased, these problems are not caused.

It is another object of the invention to provide an engine with pre-chamber, wherein even if the compression ratio of the air of the engine increased and methanol fuel is used, these problems are not caused.

It is furthermore an object of the invention to provide an engine with pre-chamber, wherein even if the compression ratio of the air of the engine is and natural gas fuel is used, these problems are not caused.

According to the present invention, there is provided an engine with pre-chamber comprising: a control valve installed between a pre-chamber and main chamber, a driver for said control valve, an injection nozzle for injecting fuel into said pre-chamber, means for controlling said control valve to a closed position during an exhaust step or an intake step and to open when last stage of compression step, and, means for controlling said injection nozzle for injecting a fuel to pre-chamber during said exhaust step.

Moreover, in the gas engine with this pre-chamber, a control valve which is driven by a solenoid valve drive unit worked by electromagnetic force opens a sub-connection passage first. Next, an electromagnetic drive unit opens a main connection passage.

The solenoid valve drive unit is composed of return spring to which the control valve is returned by the second iron plate attracted by the core by the first iron plate attracted by the core by the small electromagnetic force. The valve stem is installed in the core of an electromagnetic coil, and a large magnetic force and the demagnetization of electromagnetic force control the valve of this pre-chamber.

The first iron plate is attracted by the core and sub-connection passage is opened. The second iron plate is adsorbed by the core and a connection hole is opened.

The sub-connection passage inclines from the valve seat toward the cylinder wall in the gas engine with this pre-chamber. Therefore, the sectional area of the passage is formed to be small and a connection passage is the one that is formed at the center of the cylinder with a large sectional area.

The opening and shutting operation is done by the electromagnetic force of the solenoid valve drive unit in the gas engine with this pre-chamber and for the fuel supply valve. The valve timing and the amount of the valve lift are controlled by the instruction of the controller which responds to the state of the engine operation.

There is provided an engine with pre-chamber further comprising a spark plug in a pre-chamber.

The engine with the pre-chamber by this invention acts as described as follows.

That is, the engine with this pre-chamber has sub-connection passage formed in the valve seat which surrounds a main connection passage by which the pre-chamber is connected to the main chamber and the cylinder head formed on the cylinder side to include this main connection passage.

The control valve has a protrusion which closes a main connection passage and the valve face to the valve seat to close the sub-connection passage. Therefore, combustion gas blows from sub-connection passage in the first step of the valve lift and this gas blows toward the outer side of the piston, that is, toward the walls of main chamber.

In the second step of the valve lift, combustion gas with a main connection passage is spouted The air which remains on the piston is mixed by rolling when this gas collides on the piston and diffuses outwardly. Therefore, the combustion done by the pre-chamber is rich mixture combustion, the combustion of main combustion chamber becomes thin combustion.

This combustion can control nitrogen oxide NOx included in exhaust gas.

Sub-connection passage is inclined from the valve seat toward the cylinder wall. The sectional area of the sub-connection passage is formed smaller than the sectional area of the main connection hole. Therefore, the fuel spouts from sub-connection hole a little in the first step of the open operation of the control valve. In the second step of the open operation of the control valve, a large amount of fuel spouts from the main connection hole.

For instance, when the gas fuel with 2–3 kg/cm2 pressure in the pre-chamber is supplied in this invention. At this time, the control valve closes the main connection hole and the sub-connection hole. Therefore, the pre-chamber is filled with the gas fuel. Moreover, the injection air is introduced into the main combustion chamber during the injection step.

Next, during the compression step, the piston rises, and the injected air of main combustion chamber is compressed into a high pressure.

When the piston is advanced 20–30 degrees from the top dead center, the control valve is opened a little. Thus, the control valve opens only the sub-connection hole.

About 20% of the compressed air in the main combustion chamber is supplied to the subsidiary chamber through the sub-connection hole. The fuel in the pre-chamber does the ignition combustion when the compressed air is supplied.

The combustion expansion is done after the rich mixture is burned in the pre-chamber and a combustion flame and an unburnt mixture are spouted from the pre-chamber to main combustion chamber through the sub-connection hole.

When the piston is advanced 10–20 degrees from the top dead center, the control valve drive opens for the second step, that is, the main connection hole opens, and a combustion flame of the subsidiary chamber and the unburnt mixture gushes to the main combustion chamber at once.

When the pressure of the main combustion chamber rises to more than the pressure in the pre-chamber, the control valve is pushed up by the pressure. Therefore, the force operating the control valve can not be so large. The control valve is opened for a long time during the expansion step by the solenoid valve drive unit.

The control valve is maintained in an open position until combustion in the subsidiary chamber ends and a combustion flame and an unburnt mixture are spouted from the pre-chamber to the main combustion chamber. When combustion ends, the control valve does the operation which allows the return to the former position by the power of return spring.

The main connection hole is closed with the control valve first during this operation. The control valve is closed by the close operation of the control valve and further descends and to close the sub-connection hole. The control valve closes the main connection hole and sub-connection hole.

DETAILED DESCRIPTION OF THE PREFERRED EMBODIMENT

Figure 1:
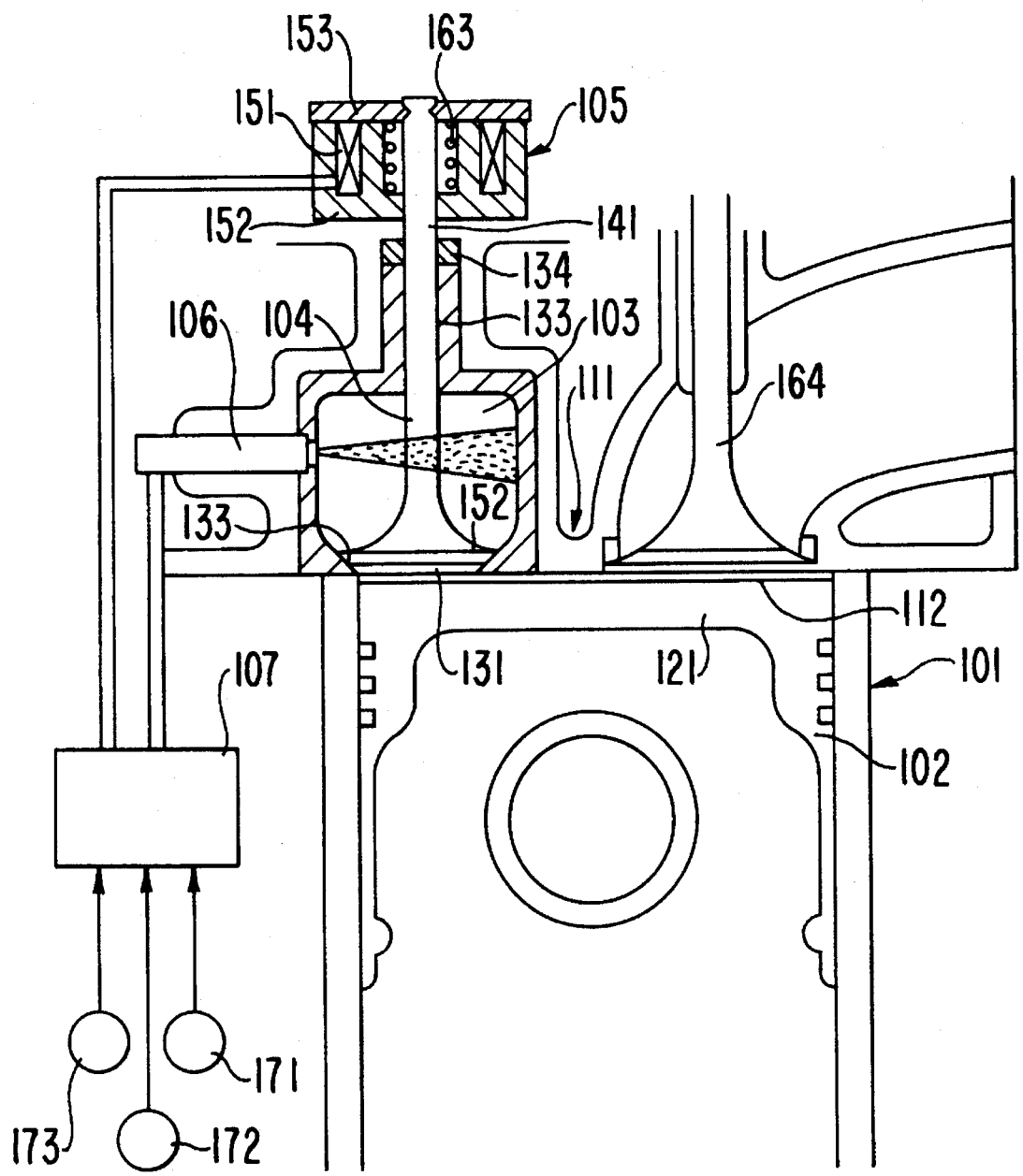
FIG. 1 is a fragmentary cross-sectional view of the first embodiment of this invention.

FIG. 1 is a fragmentary cross-sectional view of the first embodiment of the high compression ratio engine related to this invention.

In the FIG. 1, 101 denotes a cylinder and the cylinder 101 has a piston 102 which can be moved up and down in this cylinder 101. There are installed an inlet valve or an exhaust valve 164 and pre-chamber 103 which becomes pre-combustion chamber in cylinder head 111. The piston head 121 is composed of ceramics which has heat resistance and high strength. The pre-chamber 103 is composed of a high strength, heat resistance, and heat insulation material for example, silicon nitride.

Stem 141 of control valve 104 is slidably supported in an axis hole 133 which penetrates through a central upper part of the wall of pre-chamber 103. Therefore, this control valve 104 can move in the direction of the axis of stem 141 by vertical motion.

A heat insulation material 134 is installed above axis hole 133 and heat in the pre-chamber is prevented from escaping from stem 141 of control valve 104.

An electromagnetic device 105 is installed at the top of stem 141 for the opening and shutting control valve 104.

When the electric current is thrown into coil 151 of this electromagnetic device 105, core 152 is pulled down to adsorption board 153 installed on stem 141 and moves control valve 104 below. The control valve 104 shuts connection hole 131 of pre-chamber 103. 163 denotes a return spring. 106 denotes an injection nozzle. The injection nozzle 106 is installed on the sidewall of pre-chamber 103. The fuel sent from a fuel tank is ejected from injection nozzle 106 into pre-chamber 103.

The fuel injection instruction of fuel injection pump (not shown) is commanded by controller 107. The controller 107 comprises a microcomputer. The detection signal from a rotation sensor 171, load sensor 172, and crank axis position sensing device 173 of the engine is input to the controller 107. When these detection signals are input to controller 107, a fixed operation is done in the controller 107, and the controller 107 controls the operation for the injection pump or electromagnetic device 105 by the program stored in the controller 107.

Operation of the first embodiment of this invention will be described below.

During the induction stroke of the engine, connection hole 131 is closed by the control valve 104, and air flows into the cylinder from the inlet valve. During the compression stroke of the engine, the air in the cylinder is compressed by piston. And last period of compression step, the electromagnetic device 105 is operated, then connection hole 131 is opened by the valve 104. Before the connection hole 131 is opened, fuel has been injected by the injection nozzle 106 to the pre-chamber 103. The fuel in the pre-chamber 103 is activated by the remaining exhaust gas in the pre-chamber 103.

The connection hole 131 is opened by the control valve 104 at the last period of compression step, compressed and hot air is forced from the cylinder into the pre-chamber 103. The activated fuel is mixed with and ignited by the incoming hot air, but the fuel in the pre-chamber is so rich that the generation of NOx is controlled.

Afterwards, the non-burned fuel and flame generated in pre-chamber 3 is ejected for main chamber 112, and fuel and hot air in the main chamber 112 are reacted, then combustion ends. Therefore, the supplied fuel burns smoothly in the cylinder even if the compression ratio of the engine is raised.

Although one of the embodiments is explained above, the invention is not limited to this embodiment. For instance, the camshaft and the cogwheel device can be used as driving means of the control valve.

Figure 2:
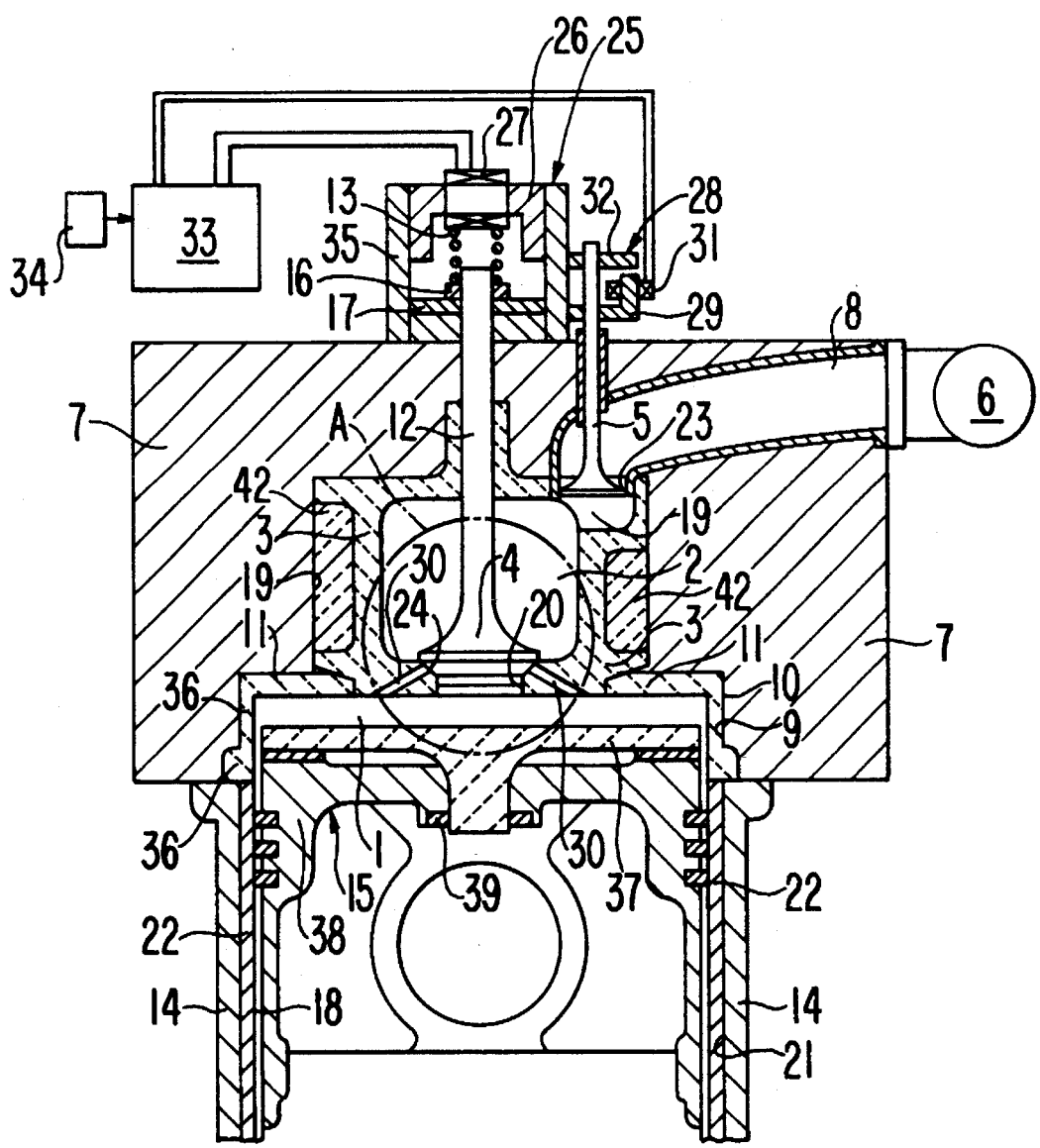
FIG. 2 is a fragmentary cross-sectional view of the second embodiment of this invention.

FIG. 2 is a fragmentary cross-sectional view of the second embodiment of this invention, and FIG. 3–FIG. 6 are explanatory drawings of the state of the control valve motion in the second embodiment of this invention.

In FIG. 2, the engine has subsidiary chamber 2 formed with side wall 3 of the heat insulating structure arranged in hole part 19 formed to cylinder head 7 fixed to cylinder block 14. In addition, the engine has a cylinder 22 fixed in a hole 21 on the cylinder block 14, piston 15, head insulated main chamber 1 and connection hole 30 connected between main chamber 1 and pre-chamber 2.

Fuel inlet 23 is formed in a wall of pre-chamber 3 and natural gas from fuel supply source 6 is supplied to pre-chamber 2 by fuel inlet 23 through fuel passage 8. Fuel supply valve 5 which opens and shuts fuel inlet 23 is arranged in cylinder head 7. The gas engine with this pre-chamber has main connection passage 20 between main chamber 1 and pre-chamber 2 and sub-connection passage 30 neat this main connection passage 20. In addition, control valve 4, which opens and shuts main connection passage 20 and sub-connection passage 30, penetrates through the pre-chamber and the control valve 4 is arranged in cylinder head 7.

Figure 3:
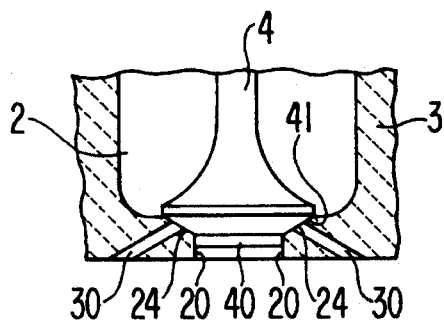
FIG. 3–FIG. 6 are explanatory drawings for the state of control valve motion of the second embodiment of this invention.

As shown in FIG. 3, the control valve 4 has protrusion 40 which engages with main connection passage 20 and a conic valve face 41 which fits into the valve sheet 24 to close the sub-connection passage 30. In addition, sub-connection passage 30 is inclined from valve sheet 24 toward the wall of cylinder. The main connection passage 20 is formed in the center of cylinder. The sectional area of main connection passage 20 is larger than that of the sub-connection passage 30. Control valve 4 is controlled by controller 33. The control valve 4 has a solenoid valve drive unit 25 which is controlled by the instruction of controller 33. The control valve 4 which is driven by electromagnetic force, opens sub-connection passage 30 first, and then opens main connection passage 20 next. The control valve 4 is driven in a double lift motion movement. Solenoid valve drive unit 25 is composed of the return spring 13 which returns control valve 4 after demagnetization of core 26. The coil 27 is wound on the core 26 which is arranged in case 35 the first iron plate 16 and the second iron plate 17 are fixed to the valve stem 12.

The first iron plate 16 and the second iron plate 17 are rectangular. The first iron plate 16 is fixed on the top of valve stem 12 and the second iron plate 17 is fitted loosely to the valve stem 12 and then they are arranged orthogonally to the plane. Moreover, first iron plate 16 and second iron plate 17 are disposed in an opposed position to each other. Therefore, when a small current flows to the electromagnetic coil 27, by the instruction of controller 33, small electromagnetic force lifts the first iron plate 16 to the core 26 and control valve 4 rises slightly.

Conic valve face 41 parts from valve seat 24, and sub-connection passage 30 opens, if control valve 4 rises slightly, and the valve 4 becomes a ??very?? small opening. Next, when a large current flows to the electromagnetic coil 27 by, the instruction of controller 33, the second iron plate 17 is in position far from the large electromagnetic force the power is applied, the large plate is attracted by core 26 and control valve 4 rises largely and protrusion 40 comes out from main connection passage 20, and main connection passage 20 opens.

The opening and shutting of fuel supply valve 5 is done by electromagnetic force in solenoid valve drive unit 28. The fuel supply valve 5 controls the state of the engine operation by instant response to the detection signal from load sensor 34 of the engine load. The valve timing and the amount of the valve lift are controlled by the instruction of controller 33. Solenoid valve drive unit 28 is composed of electromagnetic coil 31, arranged about the core 29, iron plate 32 attracted by core 29 and return spring (not shown) which closes fuel inlet 23 by use of fuel supply valve 5.

In this gas engine, main chamber 1 is formed with head liner 10 which is engaged with hole 9 formed into cylinder head 7. Head liner 10 is made from a ceramic material such as silicon nitride, is composed of lower side part 36 of the head and upper part 36 of the liner where a part of cylinder 18, and heat insulation layer is formed on the surface of the head liner 10 (not shown). A wall 3 of the pre-chamber 2 is arranged on lower side part 36 of the head.

The wall of the pre-chamber 3 is made from a ceramic material such as silicon nitride and heat insulation materials 42 such as ceramic fibers and the aluminum titanate form the face of the wall of pre-chamber 3. The inlet and outlet port can be in formed cylinder head 7 or under the cylinder and inlet valve and exhaust valve are arranged in the inlet and outlet port.

The fuel supply source 6 can be composed from a natural gas fuel tank, a natural gas accumulator. A necessary amount of natural gas is supplied from inlet 23 to pre-chamber 2 through fuel passage 8 by opening fuel supply valve 5. Moreover, connection passage valve 4 is manufactured with ceramic materials, such as silicon nitride or silicon carbide which have excellent heat resistance and high temperature strength because of the high temperature due to gas combustion in the area of main connection passage 20 and sub-connection passage 30.

Piston 15 is composed of piston skirt 38 metal flow coupled with uniting ring 39 to piston head 37 and piston head 37 which consists of ceramics such as silicon nitride which has excellent heat resistance, cylinder liner 22 is made with ceramics such as silicon nitride which has excellent sliding characteristic.

This gas engine is the one operated by repeating four cycles of the injection stroke, compression stroke, expansion stroke, and exhaust stroke sequentially. The opening and shutting drive is done by electromagnetic force by solenoid valve drive unit 25 and 28 with control valve 4 and fuel supply valve 5.

In an alternate embodiment, the valve operating mechanism may be driven by the cam drive rather than opening and shutting drive by electromagnetic force, etc. though neither of these are shown on the inlet valve nor the air release valve.

Figure 4:
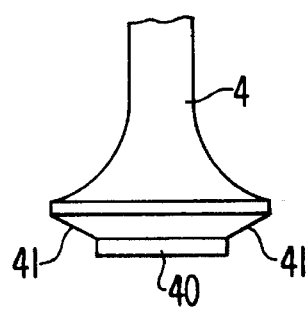

When the control valve 4 opens a little, the combustion flame is jetted to main combustion chamber as shown in FIG. 4, and reaches the outer area on the side around cylinder 18 through sub-connection passage 30.

Figure 5:
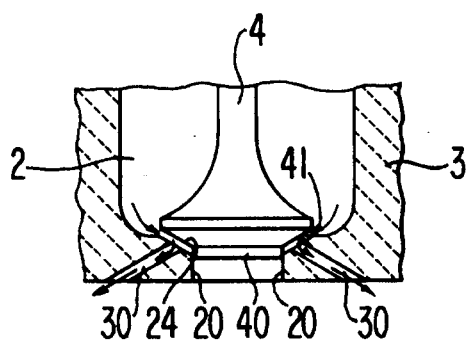
Figure 6:
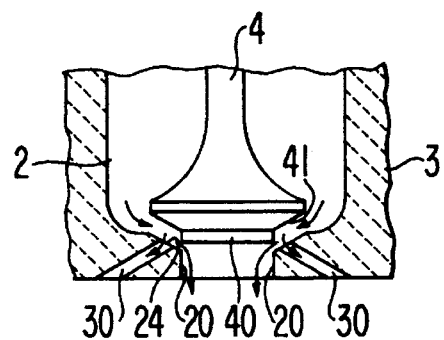

When a large current is given to solenoid valve drive unit 25 as shown in FIG. 5, and control valve 4 opens the middle opening, the combustion flame in pre-chamber 2 is jetted colliding with a central top face of piston 15.

The activated fuel is mixed with the air and ignited by the hot air, but the fuel in the pre-chamber is so rich that the generation of NOx is controlled. Afterwards, the non-burned fuel and flame generated in pre-chamber is ejected for main chamber, and fuel and hot air in the main chamber, and fuel and hot air in the main chamber are reacted, then combustion ends. Therefore, the supplied fuel burns smoothly in the cylinder even if the compression ratio of the engine is raised. And the exhaust of nitrogen oxide NOx and hydrocarbons _(HC)_ can be suppressed.

Control valve 4 is closed, fuel supply valve 5 opens at this time, and a fixed amount of fuel of a natural gas at 2–3 kg/cm2 during injection. Therefore, when the gas fuel from fuel supply source 6 is introduced into pre-chamber 2, the gas fuel is received, is heated, and activated in pre-chamber 2 because the main connection passage 20 and sub-connection passage 30 are closed with control valve 4 and the exhaust gas remains in pre-chamber 2 after burning.

Next, in the last stage of compression stroke, main connection passage 20 and sub-connection passage 30 are closed with the control valve 4 and thus increasing the compression ratio by compressing the injected air in main chamber 1 in this gas engine.

Next, control valve 4 is for instance pushed up by 20°–30° in the vicinity of compression stroke the last stage before the edge of compression, control valve 4 opens sub-connection passage 30 first of all by driving solenoid valve drive unit 25, the air made a high temperature by high compression through sub-connection passage 30 introduces, and the air of about 20% is introduced from main chamber 1 to pre-chamber 2 for instance.

When the compressed air flows in pre-chamber 2, if the mixing and ignition combustion is in progress and the pressure in pre-chamber 2 rises to more than the pressure of main chamber 1 then the combustion flame will spout from pre-chamber 2 to main chamber 1 with the gas fuel and air passing through sub-connection passage 30 and main connection passage 20.

The combustion gas spouts from sub-connection hole 30 direct to outer of piston 15 in the first step operation of control valve 4 and main combustion gas spouts from main connection hole 20 next in the second step operation of control valve 4. The gas reaching the piston head is mixed with air and defused.

Because the passage sectional area of main connection passage 20 is largely formed at the center of the cylinder, sub-connection passage 30 is inclined toward the surrounding cylinder 18 from valve seat 24, is formed with a small passage sectional area, and a small amount of spouting is done from sub-connection passage 30 with the valve lift in the first step of control valve 4 and a large amount of combustion flame is spouted from main connection passage 1 by the valve lift in the second step.

Therefore, the burning becomes rich mixture combustion in pre-chamber 2 and the burning becomes thin combustion in main chamber 1. Because control valve 4 is compressed during the injection of air into main chamber 1 and opened during the compression stroke 3 piston 15 compressing the air in main chamber 1, to overcome the pressure in the pre-chamber 2 therefore the pressure of main chamber 1 pushes up the control valve, the driving force of control valve 4 can remain and be not large.

Once control valve 4 is pushed up, the state is maintained until the connection passage is opened, the control is maintained opened with the electromagnet until combustion ends. When control valve 4 returns to former position by return spring 13, main connection passage 20 closes first, control valve 4 descends next by gravity, and sub-connection passage 30 is closed with the end of combustion.

Sub-connection passage 30 and main connection passage 20 are closed so that the gas fuel should not flow out from pre-chamber 2 to main chamber 1 through sub-connection passage 30 and main connection passage 20 when the fuel is supplied to pre-chamber 2.

The mixture of fuel and air is promoted and the combustion is concluded in main chamber 1 with existing new nature and combustion flame in a short time during the expansion stroke.

Load sensor 34 which detects the engine load is installed in this gas engine and the detection signal of this sensor 34 is input by controller 33. The engine load can be detected by measuring the amount of the fuel supply. Controller 33 includes the fuel supply valve 5 and responds to the engine load of a partial load and a full load and to control the open valve period. The amount of fuel supplied to pre-chamber 2 can be controlled by shortening the open throat period of fuel supply valve 5 to the engine at a partial load and lengthening the open throat period of fuel supply valve 5 at all loads.

Because this engine supplies the fuel from the pre-chamber to main combustion chamber at the end of the compression step, the NOx is not generated in this engine.

Figure 7:
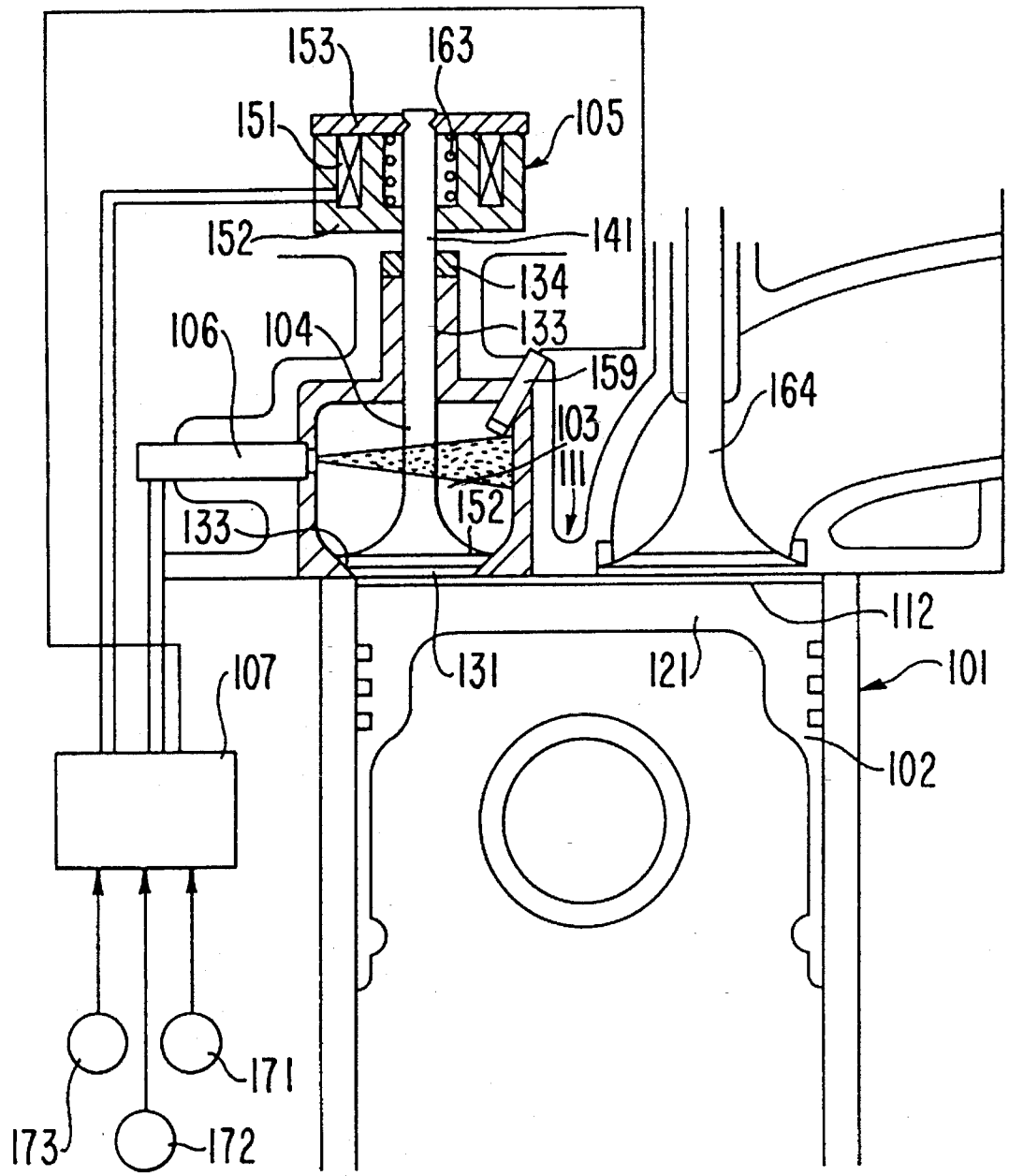
FIG. 7 is a fragmentary cross-sectional view of an embodiment of this invention.

In FIG. 7, there is provided an engine with pre chamber 103 further comprising a spark plug 159 in a pre-chamber. This embodiment can be easily ignited comparably with the above-mentioned embodiment.

According to this gas engine, it is possible to produce a pre-mixture type engine with a high compression ratio of 20 or more. Moreover, when control valve 4 opens main connection passage 20 and sub-connection passage 30, the injection air of the high compression ratio flows from main chamber 1 to pre-chamber 2, the fuel gas and the injected air mix, and ignites, and burns at high speed in the state of a rich fuel with large equivalence ratio, and the generation of NOx is controlled.

In addition, the flame is spouted to the part around cylinder 18, followed by the main flame is spouting from centers of the cylinder 18, and air and the combustion flame in main chamber 1 mixes uniformly, spouting the flame allows extremely ideal combustion.

What is claimed is:

1. An engine with a pre-chamber comprising:

a main chamber;

a pre-chamber abutting said main chamber with a portion tapering towards a passage hole, said pre-chamber having a generally cylindrical shape;

a barrier between said pre-chamber and said main chamber defining the passage hole;

a control valve for opening and closing said passage hole;

a driver for opening and closing said control valve;

an injection nozzle for injecting fuel into said pre-chamber;

control means for controlling said control valve such that the control valve is in a closed position during the exhaust stroke and intake stroke and open during the last stage of the compression stroke; and means for controlling said injection nozzle for injecting a fuel into the pre-chamber during the exhaust stroke wherein, the passage hole is opened by the increased pressure in the cylinder during the compression stroke.

2. An engine with pre-chamber according to claim 1, wherein said engine's fuel is natural gas.

3. An engine with pre-chamber according to claim 1, wherein said pre-chamber is formed from ceramic materials having at least thermal stability.

4. An engine with a pre-chamber of claim 1, wherein:

the engine is a diesel cycle engine, and the surface of the pre-chamber is heat insulating.

5. An engine with a pre-chamber of claim 1, wherein:

the control valve is closed, to seal the pre-chamber, during the intake stroke and fuel is injected into the sealed pre-chamber, and the control valve is opened by the increased pressure in the cylinder during the compression stroke, whereby the fuel is mixed with the incoming gases and the combustion.

6. An engine with a pre-chamber of claim 1, wherein:

the valve seat is heat insulating.

7. An engine with a pre-chamber of claim 1, further comprising:

at least one secondary passage for allowing low pressure gas into the combustion chamber.

8. An engine with a pre-chamber of claim 1, wherein:

the passage hole is located at the center of the cylinder.

9. An engine with a pre-chamber of claim 8, wherein:

the passage hole is surrounded by at least one secondary passage hole, and said control valve having a first position, wherein the secondary passage holes only are open, and a second position, wherein both the primary and secondary passage holes are open.

10. An engine with a pre-chamber of claim 9, wherein:

the fuel is injected during the compression stroke of the engine and while the control valve is in the first position.

11. An engine with a pre-chamber of claim 9, wherein:

the control means is an electromagnetic drive unit.

12. An engine with a pre-chamber of claim 9, wherein:

the control means is a solenoid.

13. An engine with a pre-chamber of claim 1, wherein:

the engine is heat insulating.

14. An engine with a pre-chamber comprising:

a main chamber;

a pre-chamber;

a barrier installed between said pre-chamber and said main chamber defining a passage hole;

a control valve located in said passage hole;

a driver for opening and closing said control valve;

an injection nozzle for injecting fuel into said pre-chamber;

control means for operating said driver such that said control valve is in a closed position during the exhaust stroke and intake stroke and open during the last stage of the compression stroke;

means for controlling said injection nozzle for injecting a fuel into the pre-chamber during the exhaust stroke; and at least one connection passage connecting the lower portion of the pre-chamber and the main chamber wherein said control means opens said connection passage during a first opening step and opens said passage hole and said connection hole during a second opening step.

15. An engine with pre-chamber according to claim 14, further comprising:

an ignition plug installed in said pre-chamber.

16. An engine with a pre-chamber of claim 14, wherein said pre-chamber is generally cylindrical with a portion which tapers toward said passage hole.

17. An engine with a pre-chamber comprising:

a main chamber;

a pre-chamber;

a barrier installed between said pre-chamber and said main chamber defining a passage hole;

a control valve located in said passage hole;

a driver for opening and closing said control valve;

an injection nozzle for injecting fuel into said pre-chamber;

control means for operating said driver such that said control valve is in a closed position during the exhaust stroke and intake stroke and open during the last stage of the compression stroke;

means for controlling said injection nozzle for injecting a fuel into the pre-chamber during the exhaust stroke;

wherein the force of said control means is overcome by the force of compressed air in the main chamber during the compression stroke of the engine.

18. The engine with pre-chamber of claim 17 further comprising:

a connection passage connecting the lower portion of the pre-chamber and the main chamber wherein said control means opens said connection passage during the first opening step and opens said passage hole and said connection passage during a second opening step.

19. An engine with a pre-chamber of claim 17, wherein said pre-chamber is generally cylindrical with a portion which tapers toward said passage hole.

20. An engine with pre-chamber according to claim 1 or 14 or 17, wherein said engine's fuel is methanol.

* * * * *

UNITED STATES PATENT AND TRADEMARK OFFICE
CERTIFICATE OF CORRECTION

PATENT NO. : 5,454,356
DATED : October 3, 1995
INVENTOR(S) : Hideo KAWAMURA

It is certified that error appears in the above-indentified patent and that said Letters Patent is hereby corrected as shown below:

Column 1, line 7, after "in" insert --a--; and

Column 5, line 18, delete "neat" and insert --near--.

Column 6, line 7, change "head" to --Head--.

Column 7, line 5, after "is" insert --:--; and line 33, insert paragraph indentation before "The".

Signed and Sealed this

Fourth Day of June, 1996

Attest:

BRUCE LEHMAN

*Attesting Officer*      *Commissioner of Patents and Trademarks*